United States Patent [19]

Wessel

[11] 4,178,798
[45] Dec. 18, 1979

[54] METHOD AND APPARATUS FOR MEASURING FUEL CONSUMPTION IN INTERNAL COMBUSTION ENGINES

[75] Inventor: Wolf Wessel, Oberriexingen, Fed. Rep. of Germany

[73] Assignee: Robert Bosch GmbH, Stuttgart, Fed. Rep. of Germany

[21] Appl. No.: 940,410

[22] Filed: Sep. 7, 1978

[30] Foreign Application Priority Data

Dec. 22, 1977 [DE] Fed. Rep. of Germany ....... 2757180

[51] Int. Cl.$^2$ .................. G01L 3/26; G01M 15/00
[52] U.S. Cl. ........................................ 73/113; 73/346
[58] Field of Search .................... 73/113, 114, 346

[56] References Cited
U.S. PATENT DOCUMENTS

| 3,908,366 | 9/1975 | Masaki ................................. 73/346 |
| 3,968,689 | 7/1976 | Leshner ............................... 73/346 |

OTHER PUBLICATIONS

Alcor publication—Engine Analyzer, 4 pp.

*Primary Examiner*—Donald O. Woodiel
*Attorney, Agent, or Firm*—Edwin E. Greigg

[57] ABSTRACT

The relative fuel consumption of an internal combustion engine, i.e., the fuel consumption per unit time or unit distance, is determined on the basis of measurements to ascertain the exhaust gas temperature. Based on the existing functional relationship between the exhaust gas temperature and fuel consumption, the measured exhaust gas temperature is combined with a signal related to engine speed and is used to provide a datum related to the fuel consumption per unit time. A transducer which detects the distance traveled by the vehicle is used to control an integrating circuit which generates a signal related to the fuel consumption per unit distance traveled. The signals may be used for visual displays to the operator or automatic control of other engine subsystems, for example exhaust gas recycle systems or fuel supply systems.

10 Claims, 5 Drawing Figures

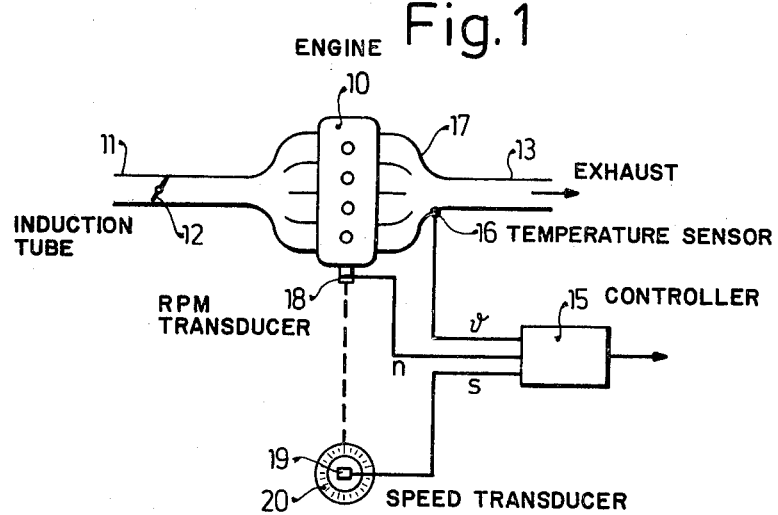
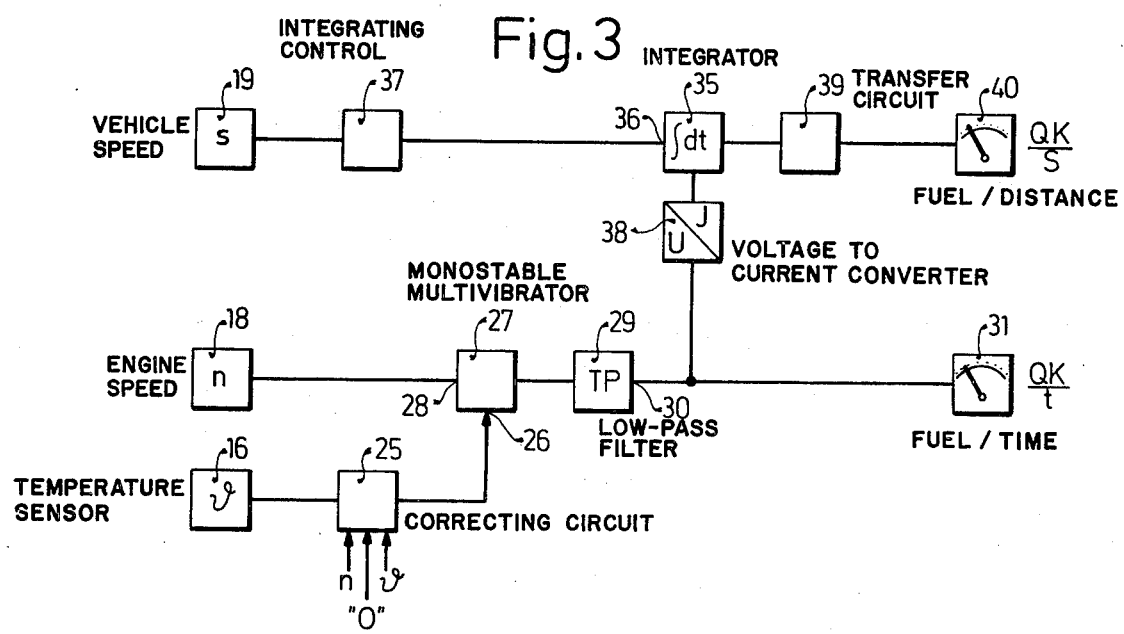

METHOD AND APPARATUS FOR MEASURING FUEL CONSUMPTION IN INTERNAL COMBUSTION ENGINES

BACKGROUND OF THE INVENTION

The invention relates broadly to internal combustion engines. More particularly, the invention relates to a method and an apparatus for measuring and monitoring the consumption of fuel in an internal combustion engine. The fuel consumption is monitored by an apparatus which employs no moving parts, thereby eliminating many potential sources of error.

In known mechanisms and devices for measuring fuel consumption, there is included a mechanically operating flow rate meter, usually a miniature turbine or some other rotating device, disposed within the fuel channel and equipped with indicators, for example signal generators which are coupled to the rotating shaft. The rotational speed of the shaft is related to the flow rate of fuel which may then be translated into a measurement of the fuel consumption per unit time or per distance traveled.

The known systems which include a rotating member have the disadvantages of relatively high constructional expense, poor reliability, and short and long term error sources, for example bearing wear and others.

OBJECT AND SUMMARY OF THE INVENTION

It is thus a principal object of the invention to provide a method and an apparatus for measuring and indicating the prevailing fuel consumption without the use of moving mechanical parts, thereby eliminating sources of error due to mechanical characteristics. It is a further object of the invention to provide a fuel flow measurement apparatus which operates externally of the hydraulic fuel line and thereby eliminates the necessity for hydraulic connections and possible leakages.

These and other objects are attained according to the invention by providing a method and apparatus in which the measurement of the exhaust gas temperature is the basic measurement performed for a measurement of the fuel consumption. In particular, the invention provides a measurement of the exhaust gas temperature in immediate proximity of the exhaust valves of the engine. The invention further provides a processing of the signal received from the exhaust gas temperature sensor on the basis of engine speed to determine the fuel consumption per unit time and/or the measurement of the distance traveled by the vehicle so as to permit measurement of the fuel consumption per unit distance traveled. It is a feature of the method and apparatus of the present invention that they may be used not only for informing the operator of the motor vehicle of the prevailing fuel consumption but also for purposes of automatic control, for example to control the injected fuel quantity.

It is a feature of the present invention that the apparatus required to perform the method can be easily embodied as an integrated electronic circuit.

In one embodiment of the invention, each of the exhaust valves of the engine has associated with it an individual exhaust gas temperature sensor, the signals of these sensors being averaged to provide an input signal for the apparatus.

The invention will be better understood as well as further objects and advantages thereof become more apparent from the ensuing detailed description of a preferred exemplary embodiment taken in conjunction with the drawing.

BRIEF DESCRIPTION OF THE DRAWING

FIG. 1 is an overall schematic diagram illustrating the main features of the method and apparatus according to the invention;

FIG. 3 is a functional block diagram of an apparatus for measuring the fuel consumption according to the present invention;

DETAILED DESCRIPTION OF THE INVENTION

Figure 2:
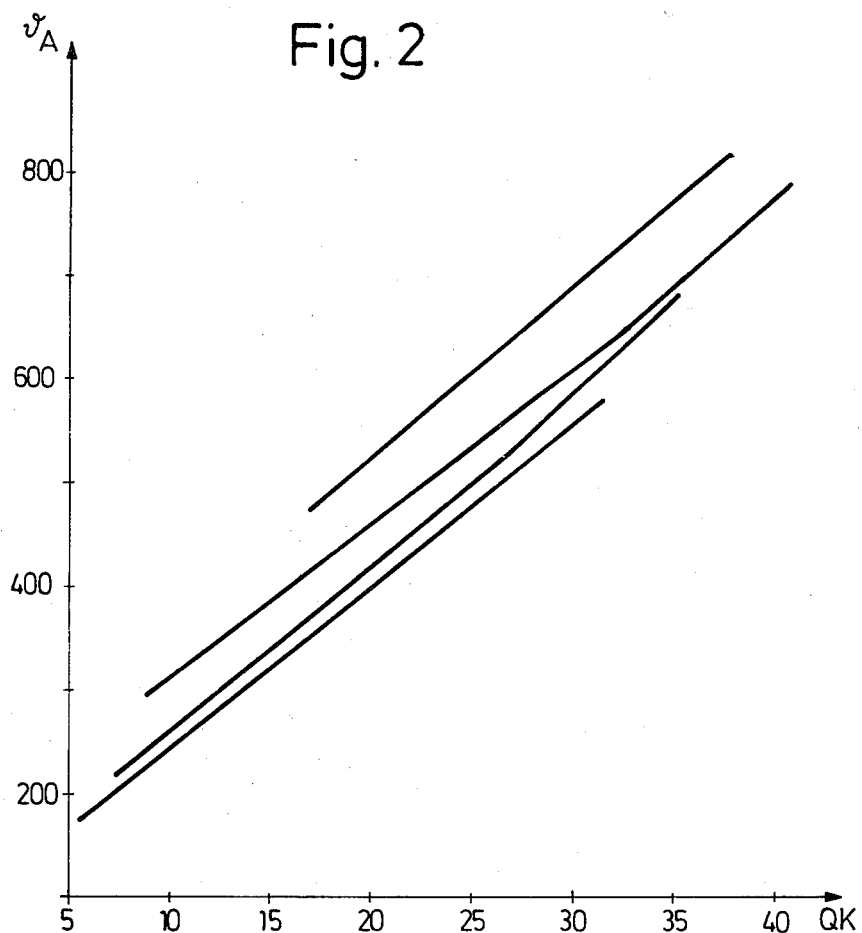
FIG. 2 is a diagram illustrating the manner in which the exhaust gas temperature varies as a function of fuel rate for various constant engine speeds.

FIG. 1 is a general diagram illustrating an internal combustion engine 10 provided with an induction tube 11 including a throttle valve 12 and an exhaust gas manifold 17 leading to an exhaust pipe 13. FIG. 1 further shows a temperature sensor 16 located in the exhaust manifold 17, a first rpm transducer 18 for generating a signal related to engine speed and a further speed transducer 19 shown in association with a vehicle wheel 20 for generating a signal related to the wheel speed or the distance traveled by the vehicle over the road. The signals from the various transducers, i.e., the temperature signal $\theta$, the engine speed signal "n" and the distance signal "s" are seen to be applied to the inputs of a general electronic controller 15 which generates a signal that is indicative of the fuel flow rate as a function of time or distance.

The electronic controller 15 will be described in greater detail below in conjunction with the illustrations of FIGS. 3 and 4a. The practical possibility of deriving information regarding the fuel flow or fuel consumption on the basis of the exhaust gas temperature is evident from the family of curves shown in FIG. 2. The diagram of FIG. 2 shows the exhaust gas temperature as a function of the fuel consumption per engine stroke with each of the four curves shown representing a single constant engine speed. It will be noticed that the variation of exhaust gas temperature as a function of fuel consumption per engine stroke is linear and that, moreover, the various curves related to different engine speeds are substantially parallel, i.e., have substantially the same slopes. Accordingly, it is possible to make a unique determination of the fuel consumption with only a measurement of the exhaust gases and one additional measurement, namely the engine speed.

In order to insure highly precise measurements, the exhaust gas temperature must be monitored in isolation of other disturbing influences. In particular, the probe must be so located as to measure a temperature unaffected by heat transfer from the exhaust gas to portions of the exhaust pipe further downstream. The measurements are also affected by the temperature of the fresh air induced by the engine. Accordingly, it is suitable to dispose a temperature sensor in the induction tube and to perform a correction on the basis of the induction tube temperature signal or to base the measurement on the difference of the induction tube air temperature and the exhaust gas temperature.

A further factor affecting the characteristic curves depicted in FIG. 2 is the air density, for example due to the atmospheric pressure or altitude. The exhaust gas temperature increases with decreasing air density and a correction for this influence may be made by disposing a suitably placed air pressure sensor or by providing a variable indicator, for example a movable bezel which can be adjusted to the prevailing altitude or air pressure.

The fuel consumption measurements and the signals derived in these measurements which relate the fuel mass per stroke to the exhaust gas temperature can be used for automatic control or forward control of several engine processes, for example exhaust gas recycling, transmission control, or the like. The particular purpose to which the invention is put determines the characteristics and the construction of the temperature sensor, in particular its sensitivity or response time. For automatic control purposes, the temperature sensor must generally have a very rapid response characteristic which, in turn, requires low-mass thermal elements or resistance measurement sensors without massive supports. However, this requirement must be balanced against the concurrent requirement of being resistant to mechanical stresses and thermal stresses.

If the fuel consumption measurements serve only for informative purposes, it is possible to use temperature sensors having substantially less sensitivity and longer time constants and these sensors may be constructed substantially more robust and may also include protective packaging or mountings. Such sensors are, for example, NTC transducers or resistance probes made of metal, for example, platinum wires or thin nickel layers combined with appropriate electronic circuits to produce the desired linear relationship between exhaust gas temperature as a function of the specific fuel consumption.

The specific fuel consumption, i.e., the fuel mass per engine stroke, is not usually as important to the vehicle operator as the fuel consumption per unit time or the fuel consumption per distance traveled. In order to transform the specific fuel consumption into one of the two indications, there is required some further electronic processing as will be explained below with the aid of FIGS. 3 and 4.

The block circuit diagram of FIG. 3 is seen to include a correcting circuit 25 which corrects the signal from the temperature sensor 16 and which has control inputs for receiving signals related to engine speed "n", the induction tube temperature $\theta$ and a zero point calibration input 0. The output of the correcting circuit 25 is applied to the time constant adjusting input of a monostable multivibrator 27 which is triggered at an input 28 by the signal from the engine speed transducer 18. Following the multivibrator 27 is a low pass filter 29 having an output contact 30 to which is connected an indicator 31 of known construction for showing the fuel consumption per unit time, i.e., the fuel rate of consumption.

The circuit shown in FIG. 3 further includes a controllable integrator 35 having a trigger input 36 connected to the output of an integrating control circuit 37 which is engaged by a secondary tachometer 19. The integrator circuit integrates the output-signal of the low pass filter 29, converted into current by the voltage to current converter 38. Following the integrator 35 is a transfer circuit 39 which is connected to control a further indicating device 40 which indicates the fuel consumption per unit distance traveled. The temperature sensor 16 generates an output signal which is related to the temperature surrounding the sensor, i.e., the temperature of the exhaust gas from the engine. This signal is corrected on the basis of engine speed and induction tube temperature and may be suitably shifted to assume a zero calibration. The output signal of the correcting circuit 25 constitutes the control variable for the monostable multivibrator 27 which is triggered at the frequency of the crankshaft or camshaft speed "n". The time constant of the monostable multivibrator 27 depends on the magnitude of the signal from the transducer 16 and determines the pulse width of the output signal of the multivibrator 27 which, in turn, represents a corrected exhaust gas temperature. The pulse width $t_i$ of the output signal of the flip-flop 27 represents a particular amount of fuel per engine stroke as represented in the family of curves of FIG. 2. This signal is received by the low pass filter 29 which transforms the series of pulses into an arithmetic average voltage which thus represents a fuel consumption per unit time. The relation between these variables may be gleaned from the following equation in which $U_{max}$ represents the output signal of the monostable multivibrator 27, T is the period of the engine speed signal generated by the tachometer 18 and $t_i$ is the pulse width of the pulses from the monostable multivibrator 27.

$$U = U_{max} \cdot (t_i/T) \propto U_{max} \cdot (Q_K/\text{time})$$

The measurement of the fuel consumption as a function of distance traveled is made by the functional blocks labeled 19, 37, 35, 39, and 40 in FIG. 3. The function of these circuits is more easily understood in conjunction with the detailed circuit diagram of FIG. 4a and the associated pulse diagram of FIG. 4b.

Figure 4B:
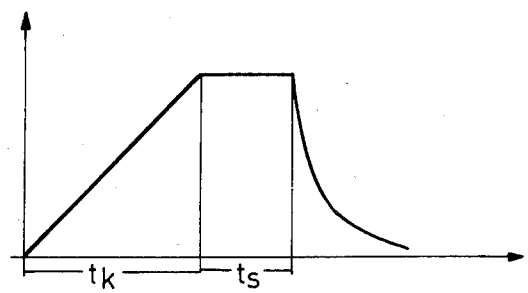
FIG. 4b is a diagram illustrating the variation of an output signal in the circuit as a function of time.
Figure 4A:
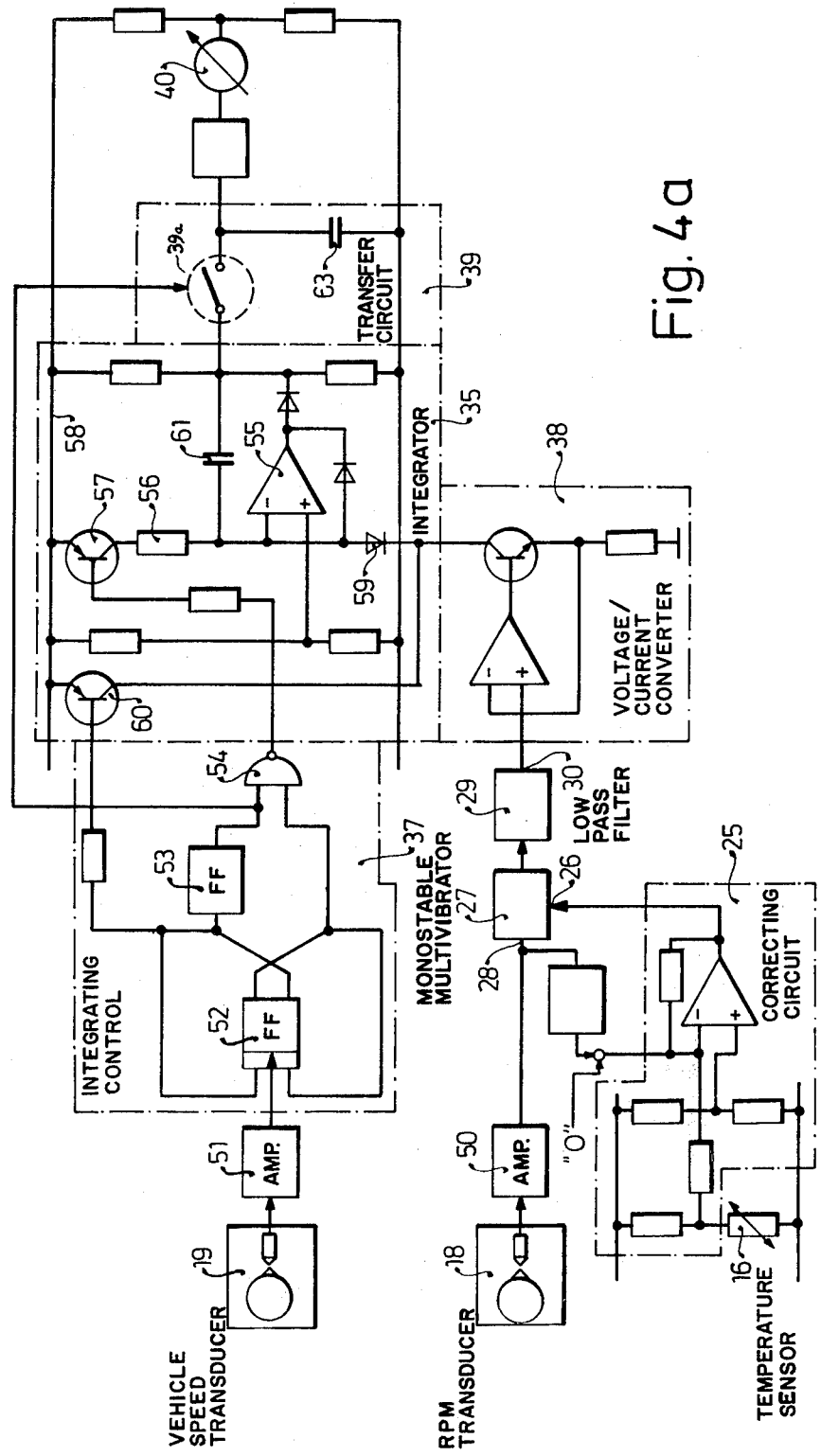
FIG. 4a is a detailed circuit diagram of the block diagram of FIG. 3.

The circuit diagram of FIG. 4a is a detailed representation of the block diagram of FIG. 3 and the blocks of FIG. 3 are generally represented in FIG. 4 by dash-dotted lines. The circuit of FIG. 4a shows the temperature sensor 16, the correcting circuit 25 embodied here as a controllable amplifier, a signal amplifier 50 connected behind the tacho generator 18, the voltage-controlled monostable flip-flop 27 as well as the low pass filter 29. Following the filter 29 is the voltage-to-current converter 38, embodied here as an amplifier-transistor combination with feedback.

Following the distance tacho generator 19 is a signal amplifier 51 feeding an integrating control circuit 37 including a flip-flop 52, a further flip-flop 53 and a NAND gate 54. The inputs of the NAND gate 54 receive the output signal of the flip-flop 53 and 52, respectively. The integrator 35 is an operational amplifier 55 with capacitive feedback whose inverting input is connected via a resistor 56 and a transistor 57 to a positive supply line 58 as well as via a diode 59 to the output of the voltage-to-current converter. The junction of the diode 59 and the converter 38 is connected to one electrode of a transistor 60 the other conductor electrode of which is connected to the aforementioned positive supply line 58. The base of the transistor 60 is connected to the junction of the output from the flip-flop 52 and the input to the flip-flop 53. The output of the NAND gate 54 is connected to the base of the transistor 57.

The output signal of the integrator 35 behaves in a manner depicted in FIG. 4b. The illustration shows a first increasing region persisting for a time $t_k$ followed by a region at a constant amplitude during a subsequent time $t_s$ and followed finally by a region in which the integrating capacitor discharges.

When the integrating capacitor charges, the transistors 57 and 60 are blocked and a well-defined current flows from the voltage-to-current converter 38 into the capacitor 61 which thereby produces an increase of the voltage across the capacitor 61 having a slope "k". For this part of the process, the following relation holds:

$$k=(\Delta U_s/t) \propto \text{current} \propto (Q_k/\text{time})$$

The integration proceeds during the time span $t_k$ which is the time elapsing between two switching events of the flip-flop and during which the vehicle has traveled a particular distance.

$$t_K \propto 1/\text{velocity} \propto \text{time/unit distance}$$

After the expiration of the time interval $t_k$ the voltage across the capacitor 61 is $$U_s = K \cdot t_K \propto Q_k/\text{unit distance}$$

Thus, the value $U_s$ is the desired fuel consumption as a function of distance traveled.

After the expiration of the integration time $t_k$, the flip-flop 52 terminates the integration by causing the transistor 60 to conduct and thereby assume the flow of the current from the voltage-to-current converter 38. For a short time $t_s$, the duration of which is determined by the output signal of the monostable flip-flop 53, the voltage across the capacitor 61 remains constant. During this time $t_s$, the voltage across the capacitor is transmitted by a transfer circuit 39 to a further capacitor 63 where it remains available for use by the subsequent indicating device 40 to show the fuel consumption as a function of distance. The transfer circuit 39 may be embodied, for example, as an electronic switch 39a, for example an MOS switch, which is controlled by the output of the multivibrator 53 and which is connected to the aforementioned capacitor 63. The charge in the capacitor 63 and therefore the voltage previously held by the capacitor 61 is retained on the capacitor 63 until the arrival of the subsequent pulse of duration $t_s$.

After the expiration of the time $t_s$, the transistor 57 is opened by the NAND gate 54 and causes a discharge of the integrating capacitor 61 to a selected initial state from which the integration process begins anew at the occurrence of the next triggering of the flip-flop 52.

The method and apparatus described above for monitoring and measuring the fuel consumption in a motor vehicle may be used for any purpose of interest. Among these are, for example, indicating the fuel consumption as a function of time or distance, but also the automatic control of the operation of the engine. When the measured results are used as a control signal, the temperature sensor 16 must have fast response times to permit rapid and exact automatic control. While the diagram of FIG. 1 shows only a single temperature sensor 16 located in the exhaust gas manifold, it may be more suitable to provide a temperature sensor at several or even at each exhaust valve to generate a median or summed value of the output signals from all these sensors to provide a signal input temperature signal for the apparatus.

The foregoing relates to preferred exemplary embodiments of the invention, it being understood that other embodiments and variants thereof may be possible without departing from the spirit and scope of the invention.

What is claimed and desired to be secured by Letters Patent of the United States is:

1. A method for measuring the relative fuel consumption of an internal combustion engine, comprising the steps of:
    generating a first signal related to the temperature of the exhaust gases of the engine with an exhaust gas temperature transducer disposed in the exhaust manifold of the engine;
    generating a second signal related to the engine speed with an engine speed tachometer;
    combining said first and second signals; and
    processing said combined first and second signals to derive therefrom a datum related to relative fuel consumption.

2. An apparatus for measuring relative fuel consumption in an internal combustion engine, comprising:
    an exhaust gas temperature transducer disposed in the exhaust manifold of the engine, for generating a first signal related to exhaust gas temperature;
    an engine speed tachometer for generating a second signal related to the rotational speed of the engine (rpm);
    timer means, connected to said tachometer to receive said second signal for actuation and connected to said transducer to receive said first signal for controlling the timing characteristics, for generating an output signal; and
    display means for processing and displaying said output signal as representing relative fuel consumption per unit time.

3. An apparatus according to claim 2, further comprising a processing circuit for receiving said first signal related to exhaust gas temperature and at least one other signal related to an engine variable and for generating therefrom a composite signal applied to control said timing means.

4. An apparatus according to claim 3, wherein said engine variable is at least one of the variables from the list consisting of engine speed, inductin air temperature, the difference between the induction air temperature and the exhaust gas temperature, and the ambient air pressure.

5. An apparatus according to claim 2, further comprising a low pass filter connected behind said timing means.

6. An apparatus according to claim 3, further comprising an integrator for receiving the output signal from said timing means to modify the constant of integration of said integrator and further comprising transducer means for generating a third signal related to path traveled by the vehicle in which the engine is installed, said integrator generating a second output signal; and second display means for receiving the output signal from said integrator and displaying it as representing fuel consumption per unit distance.

7. An apparatus according to claim 6, further comprising switch means for selective transmission of the output signal from said integrator to said second display means.

8. An apparatus according to claim 2, wherein said exhaust gas temperature transducer includes separate sensor means associated with each of the exhaust valves of said engine.

9. An apparatus according to claim 2, coupled with means for controlling the exhaust gas recycle rate of said engine.

10. An apparatus according to claim 2, coupled with means for controlling a fuel pump associated with said engine.

* * * * *